United States Patent Office 3,507,873
Patented Apr. 21, 1970

3,507,873
(±)-8-AZA-19-NORPREGN-4-EN-3,20-DIONES
Richard Clarkson, Macclesfield, England, assignor to Imperial Chemical Industries Limited, London, England, a corporation of Great Britain
No Drawing. Filed Apr. 21, 1964, Ser. No. 361,591
Claims priority, application Great Britain, May 17, 1963, 19,725/63
Int. Cl. C07d *39/02*
U.S. Cl. 260—289     6 Claims

ABSTRACT OF THE DISCLOSURE 8-aza-18-19-norpregn-4-en-3,20-diones which have progestational properties.

---

This invention relates to heterocyclic compounds which possesses therapeutic properties and which are useful as intermediates.

According to the invention I provide heterocyclic compounds of the formula:

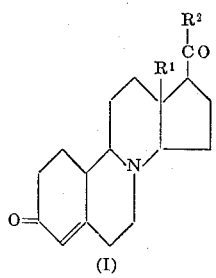

(I)

wherein $R^1$ and $R^2$, which may be the same or different, stand for lower alkyl radicals, and the salts thereof.

As one embodiment of the invention there may be mentioned, for example, those of the said heterocyclic compounds and the salts thereof which have the gonane configuration. It is to be understood that in this specification expressions such as "lower alkyl radicals" and "lower alkoxy radical" mean such radicals of not more than 6 carbon atoms. It is also to be understood that unqualified expressions such as "alkyl radical" only encompass the unsubstituted radicals in question.

As a suitable value for $R^1$ or $R^2$ there may be mentioned, for example, the methyl, ethyl or n-propyl radical.

Specific heterocyclic compounds of the invention are, for example, (±)-8-aza-19-norpregn-4-en-3,20-dione, (±)-18-methyl-8-aza-19-norpregn-4-en-3,20-dione and (±)-18-ethyl-8-aza-19-norpregn-4-en-3,20-dione.

As suitable salts of the heterocyclic compounds of the invention there may be mentioned, for example acid-addition salts, for example salts derived from inorganic acids, for example hydrochloric acid, or organic acids, for example oxalic acid.

According to a further feature of the invention I provide a process for the manufacture of the heterocyclic compounds and the salts thereof of the invention, which comprises the oxidation of a compound of the formula:

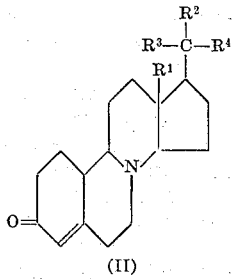

(II)

wherein $R^1$ and $R^2$ have the meanings stated above, and $R^3$ and $R^4$, which are different, stand for hydrogen or the hydroxy radical, or a salt thereof.

The oxidation may be carried out by means of any oxidizing agent which is known to be capable of converting the hydroxy-methylene radical into the keto radical, for example chromic acid, and it is conveniently carried out in a diluent or solvent, for example acetone or acetic acid.

Those of the compounds of the Formula II wherein $R^3$ stands for hydrogen and $R^4$ stands for the hydroxy radical [that is, the compounds of Formula VIII below] may be obtained by the following sequence of reactions:

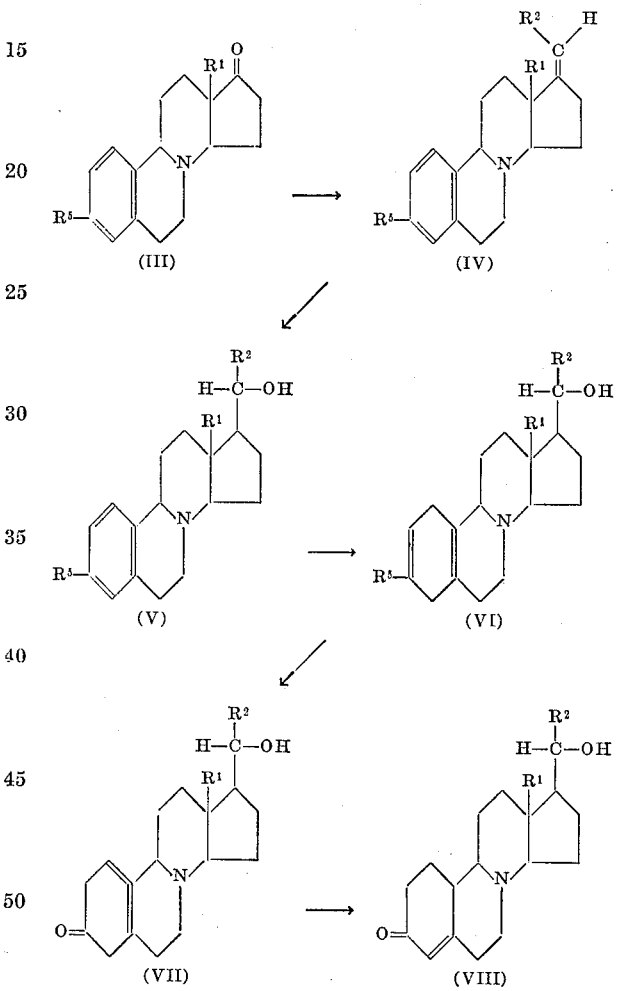

wherein $R^1$ and $R^2$ have the meanings stated above, and $R^5$ stands for an alkoxy radical, for example, a lower alkoxy radical, for example the methoxy radical.

The compounds of Formula III may be obtained by the acylation of a 2-(m-alkoxyphenyl)ethylamine with acryloyl chloride followed by addition of dimethylamine to the product to give an N-(β-dimethylamino-propionyl)-2-(m-alkoxyphenyl)-ethylamine, which is then cyclised by the Bischler-Napieralski reaction using phosphorus pentachloride to give a 1-(β-dimethylaminoethyl)-3,4-dihydro-6-alkoxyisoquinoline. This latter isoquinoline derivative is condensed with a 2-alkyl-cyclopentan-1,3-dione in the presence of pyridine to give a 3-alkoxy-8-azaoestra-1,3,5(10),9(11),14-pentaen-17-one, which on catalytic hydrogenation at ambient temperature and atmospheric pressure gives the corresponding 3-alkoxy-8-azaoestra-1,3,5(10)-trien-17-one, that is a compound of Formula III. The compounds of Formula IV may be obtained by the interaction of the compounds of Formula III with a triphenylphosphoniumylide in dimethylsulphoxide. The compounds of Formula V may be obtained by the interaction of the compounds of Formula IV with diborane in tetrahydrofuran, followed by interaction of the product with alkaline hydrogen peroxide, followed by interaction of the resulting product with hot methanol. The compounds of Formula VI may be obtained by the interaction of the compounds of Formula V with an alkali metal, for example lithium, and liquid ammonia, and a proton source, for example an alcohol, for example t-butanol, in a solvent, for example tetrahydrofuran, ether or dioxane. The compounds of Formula VII may be obtained by the hydrolysis of the compounds of Formula VI by the interaction thereof with an inorganic acid, for example hydrochloric acid, or an organic acid, for example oxalic acid, conveniently in a diluent or solvent, for example water, and in an inert atmosphere, for example an atmosphere of nitrogen. The compounds of Formula VIII may be obtained by the interaction of the compounds of Formula VII with a base, for example an alkali metal hydroxide or lower alkoxide, for example sodium hydroxide, sodium methoxide or potassium t-butoxide, or a tertiary organic base, for example pyridine, conveniently in a diluent or solvent, for example aqueous methanol, and in an inert atmosphere, for example an atmosphere of nitrogen.

Those of the compounds of Formula II wherein $R^3$ stands for the hydroxy radical and $R^4$ stands for hydrogen [that is, the compounds of Formula XIV below] may be obtained by the following sequence of reactions:

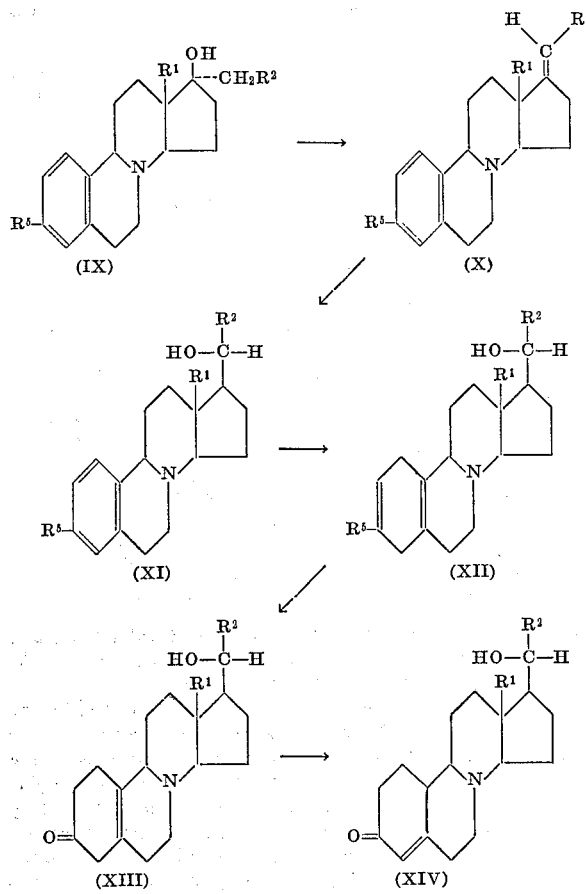

The compounds of Formula IX may be obtained as described in our co-pending U.S. application S.N. 361,554, filed Apr. 21, 1964 and now issued as U.S. Patent 3,270,021. The compounds of Formula X may be obtained by the dehydration of the compounds of Formula IX, for example by the interaction thereof with phosphorus oxychloride in pyridine. The compounds of Formula XIV may be obtained from the compounds of Formula X via the intermediate compounds of Formulae XI, XII and XIII by analogous procedures to those described above for preparing the compounds of Formula VIII from the compounds of Formula IV.

As stated above, the heterocyclic compounds of Formula I and the salts thereof possess therapeutic properties, and in particular they possess useful progestational properties.

According to a further feature of the invention, therefore, we provide pharmaceutical compositions comprising one or more compounds of Formula I or the salts thereof, and a pharmaceutically-acceptable diluent or carrier therefor.

The pharmaceutical compositions of the invention may be in the form of tablets, capsules, aqueous or oily solutions, aqueous or oily suspensions, emulsions, sterile injectable aqueous or oily solutions or suspensions, or dispersible powders.

Suitable tablets may be formulated by admixture of the active ingredient(s) with known pharmaceutical excipients, for example inert diluents, for example calcium carbonate, calcium phosphite, lactose or mannitol, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose or sucrose, and a flavoring agent, for example vanillin or orange extract, in order to provide a palatable product. The aqueous suspensions of the invention may also contain suspending or thickening agents, for example sodium carboxymethylcellulose, wetting agents, for example condensation products of fatty alcohols with ethylene oxide, and preservatives, for example methyl or n-propyl p-hydroxybenzoate.

The emulsions of the invention may contain the active ingredient(s) dissolved in an oil of vegetable or animal origin, for example arachis oil or cod liver oil, and may also contain sweetening agents and flavoring agents which may with advantage be essential oils. The said emulsions may also contain emulsifying agents and dispersing agents, for example soya bean lecithin, polyoxyethylene sorbitan mono-oleate, gum acacia, gum tragacanth or casin, and preservatives, for example methyl or propyl p-hydroxybenzoate, and anti-oxidants, for example propyl gallate.

The oily solutions of the invention likewise may contain the active ingredient(s) in solution in an oil of vegetable or animal origin, and may optionally contain flavoring agents to mask the taste and improve oral acceptability. Such oily solutions may advantageously be filled into soft gelatin capsules. The oily solutions may also contain sweetening agents, for example icing sugar, in which case the oil phase may in addition contain a suspending agent, for example beeswax, to maintain the redispersion properties of the suspension.

Oral compositions in the form of gelatin capsules may consist of capsules containing active ingredient(s) only or the capsules may contain the active ingredient(s) in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenol-polyethylene oxide condensate, for example the condensation product of octylcresol with about 8–10 molecular proportions of ethylene oxide. The sterile injectable oily solutions of the invention may be prepared from a non-toxic injectable oil, for example arachis oil or ethyl oleate, and they may additionally contain gelling agents, for example aluminum stearate, to delay absorption within the body.

These aqueous and oily injectable preparations may contain preservatives such as methyl or n-propyl p-hydroxybenzoate or chlorobutanol.

The pharmaceutical compositions of the invention may optionally additionally contain one or more known medicinal steroids.

The invention is illustrated but not limited by the following examples in which the parts are by weight:

EXAMPLE 1

To a solution of 0.175 part of (±)-8-aza-19-norpregn-4-en-20α-ol-3-one in 35 parts of acetone at 0° C. there is added 0.17 part by volume of 8 N-chromic acid. The mixture is stirred for 30 minutes at 0° C., and 0.5 part of methanol and 30 parts of water are added. The acetone is evaporated in vacuo and the aqueous residue is basified with saturated aqueous potassium carbonate. The mixture is extracted three times, each time with 15 parts of chloroform. The combined chloroform extracts are washed with 10 parts of water and evaporated. The residue is crystallised from a mixture of ethyl acetate and light petroleum (B.P. 60–80° C.) and there is thus obtained (±)-8-aza-19-norpregn-4-en-3,20-dione, M.P. 159–160° C.

The (±)-8-aza-19-norpregn-4-en-20α-ol-3-one used as starting material may be obtained as follows:

A stirred suspension of 0.96 part of a 50% w./w. dispersion of sodium hydride in oil in 30 parts of dry dimethylsulphoxide is heated at 70° C. for 30 minutes under an atmosphere of nitrogen. The resulting solution is cooled to ambient temperature and 7.95 parts of ethyltriphenylphosphonium bromide are added to it. The red solution is stirred at ambient temperature for 15 minutes and 1.425 parts of (±)-3-methoxy-8-azaoestra-1,3,5(10)-trien-17-one (M.P. 172–173° C.; obtained as described in Example 2 in my co-pending U.S. application Ser. No. 282,547) are added to it. The resulting solution is stirred at ambient temperature for 18 hours, then at 75° C. for 1 hour, and is then cooled to 20° C. and diluted with 30 parts of water. The mixture is extracted three times, each time with 70 parts of light-petroleum (B.P. 60–80° C.). The combined extracts are concentrated to 75 parts by volume and the concentrate is adsorbed onto a column consisting of 100 parts of alumina. The column is eluted with light-petroleum (B.P. 60–80° C.) to remove the oil in which the sodium hydride was dispersed, and is then eluted with a 20% v./v. mixture of ethyl acetate in benzene.

The ethyl acetate-benzene eluate is evaporated in vacuo and the residual oil is crystallised from methanol. There is thus obtained (±)-cis-3-methoxy-8-aza-19-norpregna-1,3,5(10),17(20)-tetraene, M.P. 84–85° C.

Diborane, generated by the dropwise addition of 0.114 part of sodium borohydride in 5 parts of diethyleneglycol dimethyl ether to a solution of 1 part of boron trifluoride etherate in 4 parts of diethyleneglycol dimethyl ether, is passed into a solution of 0.297 part of (±)-cis-3-methoxy-8-aza-19-norpregna-1,3,5(10),17(20)-tetraene in 6 parts of dry tetrahydrofuran. The mixture is stirred at ambient temperature for 1½ hours, and to it there are added successively 1 part of water, 10 parts of tetrahydrofuran, 1 part of 2 N-aqueous sodium hydroxide and 3 parts of 30% hydrogen peroxide. The mixture is stirred for 20 minutes, 20 parts of water are then added and the tetrahydrofuran is removed by evaporation in vacuo. The residual aqueous suspension is filtered, and the solid residue is washed with water and dried in vacuo over silica gel. The product is (±)-3-methoxy-8-aza-19-norpregna-1,3,5(10)-trien-20α-ol-borane, M.P. 120–125° C. with decomposition. This is dissolved in 5 parts of boiling methanol. The solution is boiled for about 1 minute, diluted with 2 parts of water and then cooled and filtered. The residue is crystallised from light petroleum (B.P. 80–100° C.) and there is thus obtained (±)-3-methoxy-8-aza-19-norpregna-1,3,5(10)-trien-20α-ol, M.P. 138–141° C.

To a solution of 0.315 part of (±)-3-methoxy-8-aza-19-norpregna-1,3,5(10)-trien-20α-ol in a mixture of 20 parts of liquid ammonia, 10 parts of tetrahydrofuran and 10 parts of t-butanol there is added 0.21 part of lithium metal during 15 minutes. The solution is stirred for 3½ hours, 5 parts of methanol are then added and the ammonia is allowed to evaporate. 20 parts of water are then added, the organic solvents are removed in vacuo and the resulting aqueous suspension is filtered. The solid residue is dried in vacuo over solid potassium hydroxide, and there is thus obtained (±)-3-methoxy-8-aza-19-norpregna-2,5(10)-dien-20α-ol, M.P. 104–110° C. This material is dissolved in 20 parts of 0.1 M-aqueous oxalic acid and the resulting solution is kept at ambient temperature for 1½ hours in a nitrogen atmosphere. The solution is basified with saturated aqueous potassium carbonate and the resulting mixture is filtered. The solid residue is dried in vacuo over silica gel. There is thus obtained (±) - 8 - aza - 19 - norpregn - 5(10) - en - 20α-ol-3-one, M.P. 125–135° C. This material is dissolved in a mixture of 5 parts of methanol and 1 part of 2 N-aqueous sodium hydroxide. The solution is allowed to stand at ambient temperature for ½ hour, 5 parts of water are then added and the methanol is evaporated in vacuo. The aqueous residue is extracted three times, each time with 10 parts of chloroform. The combined chloroform extracts are washed with 5 parts of water and then evaporated to dryness. There is thus obtained (±)-8-aza-19-norpregn-4-en-20α-ol-3-one, $R_f$ 0.35 (thin layer chromatography on alumina using 25% v./v. ethylacetate-benzene as the developing solvent).

EXAMPLE 2

The process described in Example 1 is repeated except that the (±) - 8 - aza - 19 - norpregn - 4 - en - 20α - ol - 3 - one is replaced by an equivalent weight of (±)-18-methyl - 8 - aza - 19 - norpregn - 4 - en - 20α - ol - 3 - one, and the reaction time is extended to 30 minutes at 0° C. followed by 1 hour at ambient temperature. There is thus obtained (±) - 18 - methyl - 8 - aza - 19 - norpregn - 4 - en - 3,20 - dione, M.P. 137–145° C. [crystallised from light petroleum (B.P. 80–100° C.)].

The (±) - 18 - methyl - 8 - aza - 19 - norpregn - 4 - en-20α-ol-3-one (M.P. 152–155° C.) used as starting material may be prepared by an analogous reaction sequence to that described in Example 1 starting from (±)-13-ethyl - 3 - methoxy - 8 - azagona - 1,3,5(10) - trien - 17 - one (M.P. 129–130° C.; obtained as described in Example 3 in our co-pending application Ser. No. 282,547) via the following intermediates: (±) - cis - 3 - methoxy - 18-methyl - 8 - azapregna - 1,3,5(10),17(20) - tetraene, M.P. 118–120° C.; (±) - 3 - methoxy - 18 - methyl - 8 - aza-19 - norpregna - 1,3,5(10) - trien - 20α - ol, M.P. 140–144° C.; (±) - 3 - methoxy - 18 - methyl - 8 - aza - 19-norpregna - 2,5(10) - dien - 20α - ol, M.P. 85° C. with decomposition; and (±) - 18 - methyl - 8 - aza - 19 - norpregna-5(10)-en-20α-ol-3-one, M.P. 55–65° C.

EXAMPLE 3

The process described in Example 2 is repeated except that the (±) - 18 - methyl - 8 - aza - 19 - norpregn - 4 - en-20α-ol-3-one is replaced by an equivalent weight of (±) - 18 - ethyl - 8 - aza - 19 - norpregn - 4 - en - 20α - ol-3-one. There is thus obtained (±) - 18 - ethyl - 8 - aza-19-norpregn-4-en-3,20-dione, which has the double M.P. 167–170° C. and 173–179° C.

The (±) - 18 - ethyl - 8 - aza - 19 - norpregn - 4 - en-20α-ol-3-one (M.P. 85–95° C.) used as starting material may be prepared by an analogous reaction sequence to that described in Example 1 starting from (±)-3-methoxy-13 - n - propyl - 8 - azagona - 1,3,5(10) - trien - 17 - one (M.P. 123–124° C.; obtained as described in Example 4 in our co-pending application Ser. No. 282,547) via the following intermediates: (±) - cis - 18 - ethyl - 3 - methoxy - 8 - aza - 19 - norpregna - 1,3,5(10),17(20) - tetraene, M.P. 120–124.5° C.; (±) - 18 - ethyl - 3 - methoxy- 8 - aza - 19 - norpregna - 1,3,5(10) - trien - 20α - ol, M.P. 151–154° C.; (±) - 18 - ethyl - 3 - methoxy - 8 - aza - 19-norpregna-2,5(10)-dien-20α-ol, M.P. 167–174° C.; and (±) - 18 - ethyl - 8 - aza - 19 - norpregn - 5(10) - en - 20α-ol-3-one, M.P. 166–173° C.

EXAMPLE 4

5 parts of (±) - 18 - methyl - 8 - aza - 19 - norpregn-4-en-3,10-dione, 5 parts of maize starch and 48 parts of lactose are intimately mixed and granulated with 10% maize starch paste. The granules are dried at a temperature not exceeding 50° C., and then mixed with 0.5 part of magnesium stearate and compressed into tablets each weighing 60 mg. There are thus obtained tablets suitable for oral administration for therapeutic purposes.

What I claim is:

1. A heterocyclic compound selected from the group consisting of compounds of the formula:

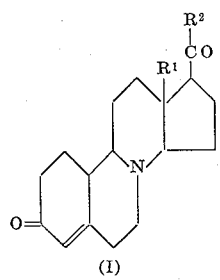

(I)

wherein $R^1$ and $R^2$ are selected from the group consisting of methyl, ethyl and n-propyl, and the acid addition salts of said compounds.

2. Compounds as claimed in claim 1 which have the gonane configuration.

3. The compound (±) - 8 - aza - 19 - norpregn - 4-en-3,20-dione.

4. The compound (±) - 18 - methyl - 8 - aza - 19 - norpregn-4-en-3,20-dione.

5. The compound (±) - 18 - ethyl - 8 - aza - 19 - norpregn-4-en-3,20-dione.

6. A nontoxic acid addition salt as claimed in claim 1 wherein the acid is selected from the group consisting of hydrochloric acid and oxalic acid.

References Cited

Merck Index, 7th edition, p. 856 relied on (1960).

Fieser et al.: Natural Products Related to Phenanethenes, Reinhold, 1949, pp. 122, 123, 312, 360 and 446 relied upon.

DONALD G. DAUS, Primary Examiner

U.S. Cl. X.R.

260—286; 424—258